United States Patent [19]

Chivari

[11] 4,246,767
[45] Jan. 27, 1981

[54] COUPLING FOR THE VIBRATION-DAMPING TRANSMISSION OF TORQUES

[76] Inventor: Ilie Chivari, Berliner Strasse 1, 4690 Herne 2, Fed. Rep. of Germany

[21] Appl. No.: 10,426

[22] Filed: Feb. 8, 1979

[30] Foreign Application Priority Data

Feb. 15, 1978 [DE] Fed. Rep. of Germany ....... 2806350

[51] Int. Cl.³ .......................... F16D 3/48; F16D 3/28; F16D 3/52
[52] U.S. Cl. ...................................... 64/11 R; 64/12; 64/27 R; 64/19
[58] Field of Search .................. 64/27 NM, 12, 11 R, 64/27 R, 27 L, 19

[56] References Cited

U.S. PATENT DOCUMENTS

| | | | |
|---|---|---|---|
| 3,759,064 | 9/1973 | Jörn et al. | 64/12 |
| 4,016,731 | 4/1977 | Foushee | 64/12 X |
| 4,031,715 | 6/1977 | Shekar | 64/12 X |

FOREIGN PATENT DOCUMENTS

| | | | |
|---|---|---|---|
| 1475339 | 5/1969 | Fed. Rep. of Germany | 64/27 NM |
| 2318612 | 11/1974 | Fed. Rep. of Germany | 64/27 NM |
| 2510678 | 9/1976 | Fed. Rep. of Germany | 64/27 NM |
| 2626414 | 12/1977 | Fed. Rep. of Germany | 64/27 NM |
| 2657527 | 6/1978 | Fed. Rep. of Germany | 64/27 MM |

Primary Examiner—Henry K. Artis
Attorney, Agent, or Firm—Laney, Dougherty, Hessin & Beavers

[57] ABSTRACT

An improved coupling for the vibration-dampening transmission of torques is provided, which includes inner and outer annular coupling members with a resiliently deformable intermediate member arranged between the coupling members. The coupling includes connection means comprising flexible elements attached to the coupling members and extending around the intermediate member so that the intermediate member is resiliently deformed by compressive loading with relative angular movement of the coupling members. The coupling members, intermediate member, and connection means are so arranged and constructed that the intermediate member may be removed without dismantling the coupling members.

27 Claims, 10 Drawing Figures

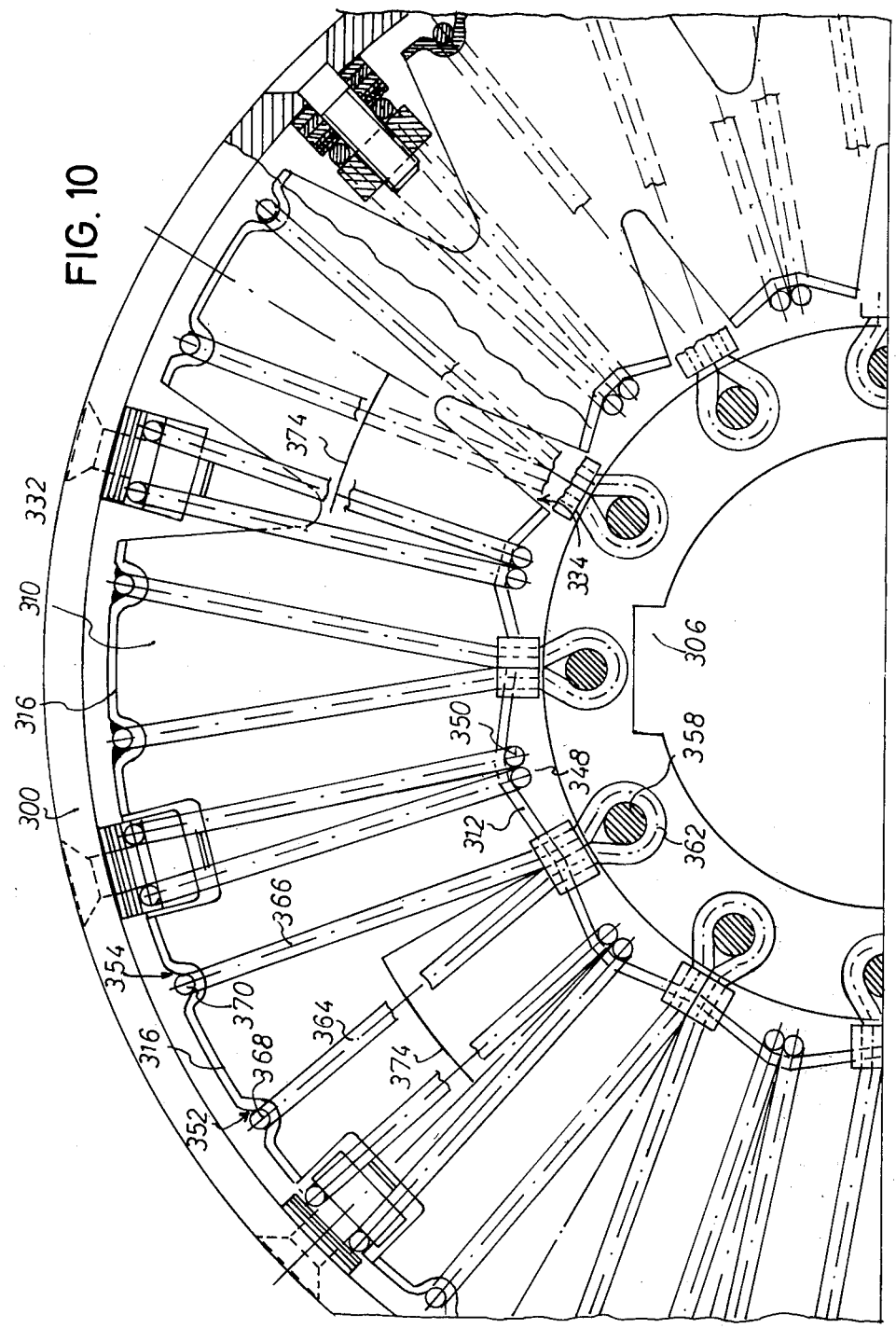

COUPLING FOR THE VIBRATION-DAMPING TRANSMISSION OF TORQUES

BACKGROUND OF THE INVENTION

The invention relates to a coupling for the vibration-damping transmission of torques, comprising: a first coupling member, a second coupling member substantially coaxial therewith, at least one resiliently deformable intermediate member, which is arranged between the first and the second coupling members, connection means, which comprise flexible elements, are attached to the coupling members and extend in loops around the intermediate member, whereby these loops shorten in axial direction with relative angular movements of the coupling members and deform the intermediate member resiliently by compressive load.

Such a coupling is, for example, known from the documents laid open of German patent application No. 23 18 612. With this prior art coupling the intermediate member consists of a two-part rubber body of generally toroidal shape which is arranged between an annular outer coupling member and a hub-like inner coupling member and which is connected to both coupling members by vulcanization. The rubber body forms a cavity, which may be inflated by compressed air. The ropes are vulcanized into the rubber body.

SUMMARY OF THE INVENTION

It is the object of the invention to design a coupling of the kind defined in the beginning such that the manufacturing is simplified and exchange of the intermediate member is possible without dismantling the remaining components of the coupling.

According to the invention, this object is achieved in that the intermediate member is a constructional element separated from the coupling members and from the connection means, and that the connection means are arranged with respect to the intermediate member to hold the intermediate member positively between the loops.

With the coupling of the invention, the intermediate member is a component, which is not fixedly attached to the coupling members but is held by the connection means only. Thus during the manufacturing process no vulcanization of the intermediate member to the coupling members is required. To remove the intermediate member, it is only necessary to release the connection means from the coupling members on one side and to fold them away, in order to remove the intermediate member in axial direction.

Further modification of the invention are subject matter of the sub-claims.

Some embodiments of the invention are described in greater detail hereinbelow with reference to the accompanying drawings:

Brief Description Of The Drawings

FIG. 10 shows the embodiment of FIG. 9 as viewed in axial direction and partly in section.

DETAILED DESCRIPTION OF THE PREFERRED EMBODIMENTS OF THE INVENTION

Figure 1:
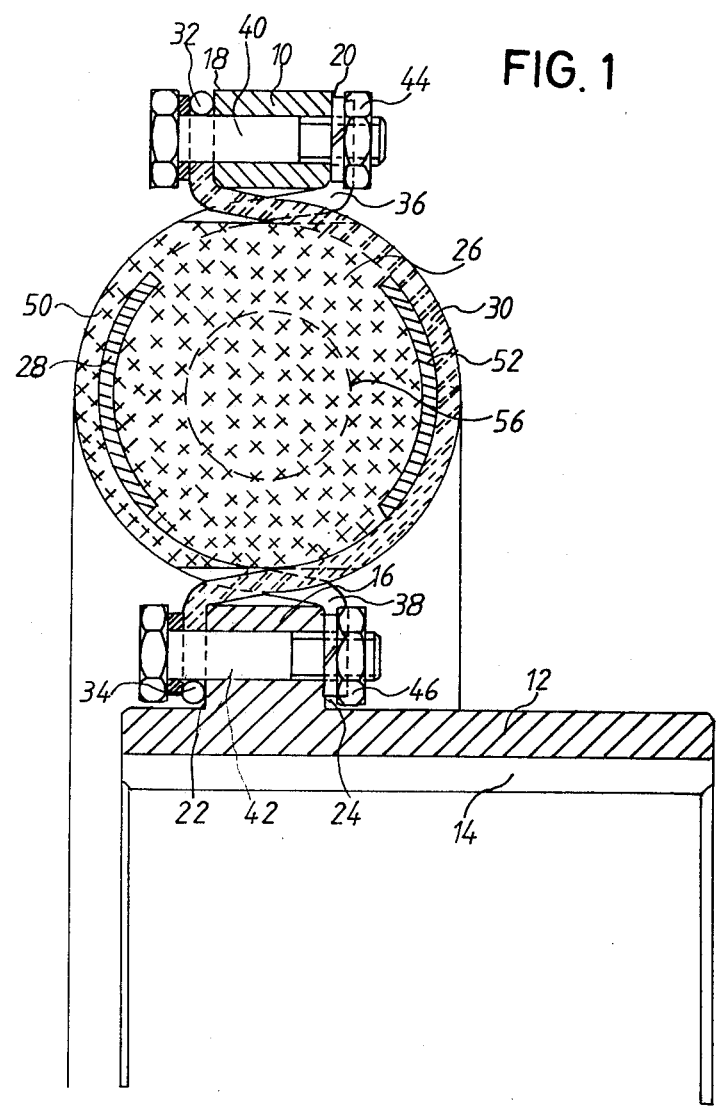
FIG. 1 is a longitudinal sectional view of a coupling in accordance with the invention.
Figure 2:
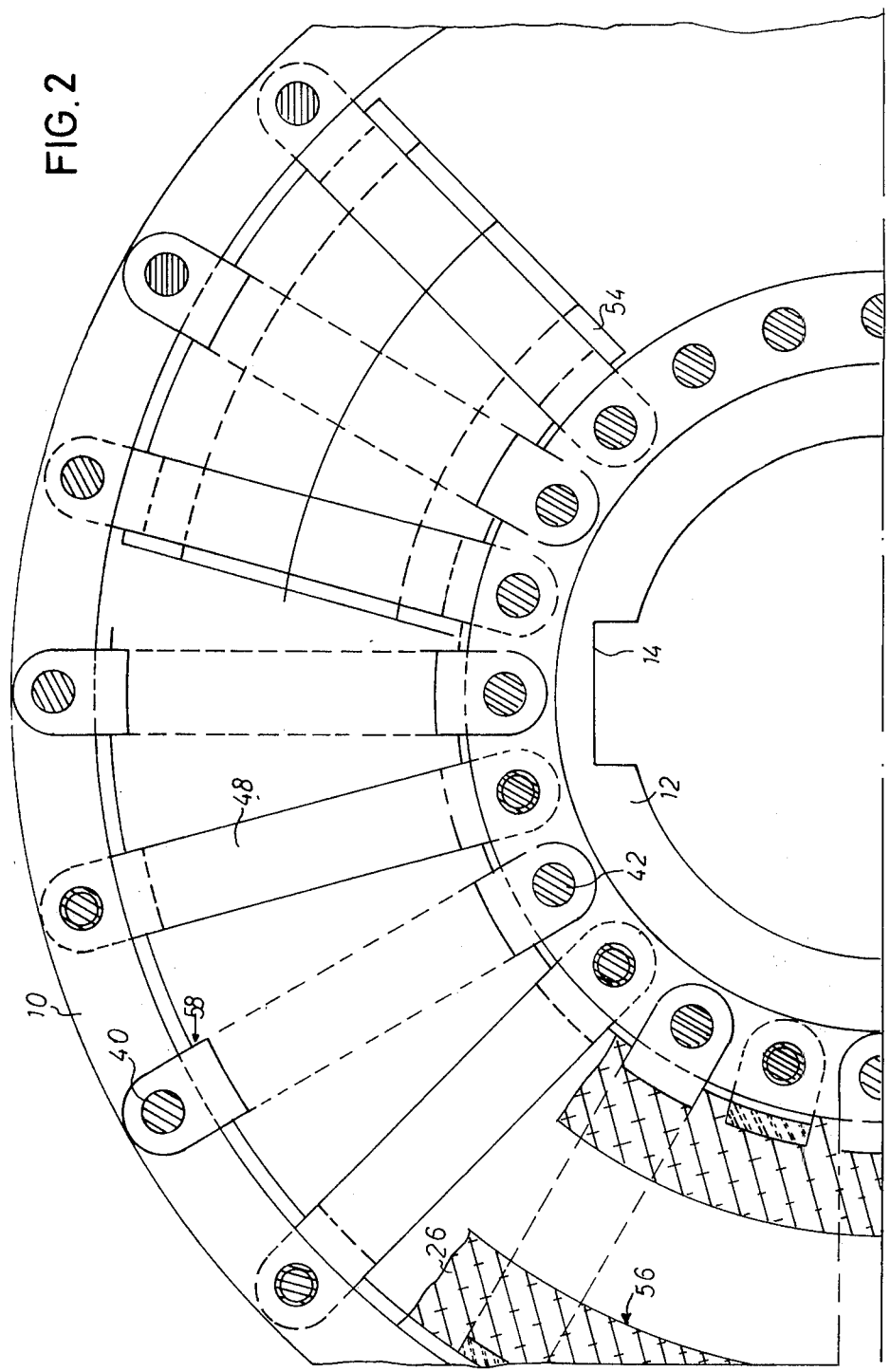
FIG. 2 is a view in axial direction, partly in section of a coupling of FIG. 1.

In the embodiment of FIGS. 1 and 2, numeral 10 designates a first, outer coupling member, and numeral 12 designates a hub-like inner second coupling member. The second coupling member 12 has a keyway 14 by means of which the coupling member 12 can be connected non-rotatably to a shaft. The second coupling member 12 has a radial flange 16 concentric with the annular first coupling member 10. The first coupling member has end faces 18 and 20 on opposite sides and facing in axial direction. The radial flange 16 of the second coupling member 12 has end faces 22 and 24 on opposite sides and facing in axial direction.

A resilient intermediate member 26 is arranged between the first coupling member 10 and the second coupling member 12. The intermediate member is a component separated from the coupling members 10 and 12. Flexible elements 28 and 30, such as ropes, which are connected to the first and to the second coupling member 10 and 12, respectively, extend in longitudinal planes alternatingly on one side or on the other side in loops around the intermediate member 26.

The intermediate member has generally toroidal shape. The ropes 30 are attached to the left end faces 18 and 22 as viewed in FIG. 1, of the annular coupling member 12, and extend around the intermediate member around the surface remote from these end faces 18 and 20, thus on the right side in FIG. 1. The ropes 28 are attached to the right end faces 20 and 24, as viewed in FIG. 1, of the coupling member 10 and of the radial flange 16 of the coupling member 12, respectively, and extend around the intermediate member 26 around the surface remote from these end faces 20,24, thus on the left side in FIG. 1.

Each of the ropes 28 and 30 is endless, i.e. the two ends of each rope are connected to each other, and the ropes are folded together to form two parallel rope sections. An attachment loop 32,34 and 36,38, respectively, is formed at each end thus provided. These attachment loops are passed around bolts 40 and 42, respectively, on the first coupling member 10 or the second coupling member 12, respectively, and are clamped between the heads of the bolts 40,42 and the end faces 18,22, and between nuts 44,46, which are screwed on the bolts 40,42, and the end faces 20,24. As can best be seen from FIG. 2, the ropes are embedded in strip-like rubber bodies 48, which can be handled more easily and which ensure good contact with the intermediate member 26.

In the embodiment of FIG. 1 and 2, the intermediate member is a solid elastomeric or rubber body. Spaced shell-shaped bodies 50,52 are arranged on both sides of the intermediate body on the surface portions around which the ropes extend, the support bodies 50 provided on one side being arranged in staggered relation to the support bodies 52 provided on the other side, and the ropes 28,30 engaging the outer surfaces of the support bodies.

Thus the ropes are also separated from the intermediate member 26. The elastomeric or rubber body forming the intermediate member 26 is divided at least once in a longitudinal plane. The intermediate member may, however, also comprise a plurality of separated, elastomeric or rubber bodies 54, as shown in the right portion of FIG. 2.

As indicated in dashed lines in FIG. 1 and as shown in the sectional view on the left side of FIG. 2, the elastomeric or rubber body may also have a cavity 56 extending in circumferential direction.

In order to remove the intermediate member, the nut 44 can be unscrewed and the bolts 40 can be retracted. Then the ropes 30 can be folded to the bottom, whereby the intermediate member 26 may be pulled out, for example to the right in FIG. 1. By dividing the intermediate member, the intermediate member 26 can be removed without this removal being impeded by the shaft.

As can be seen from FIG. 2, the intermediate member 26 has peripheral grooves 58 in longitudinal planes, in which the rubber strips 48 are guided.

Figure 3:
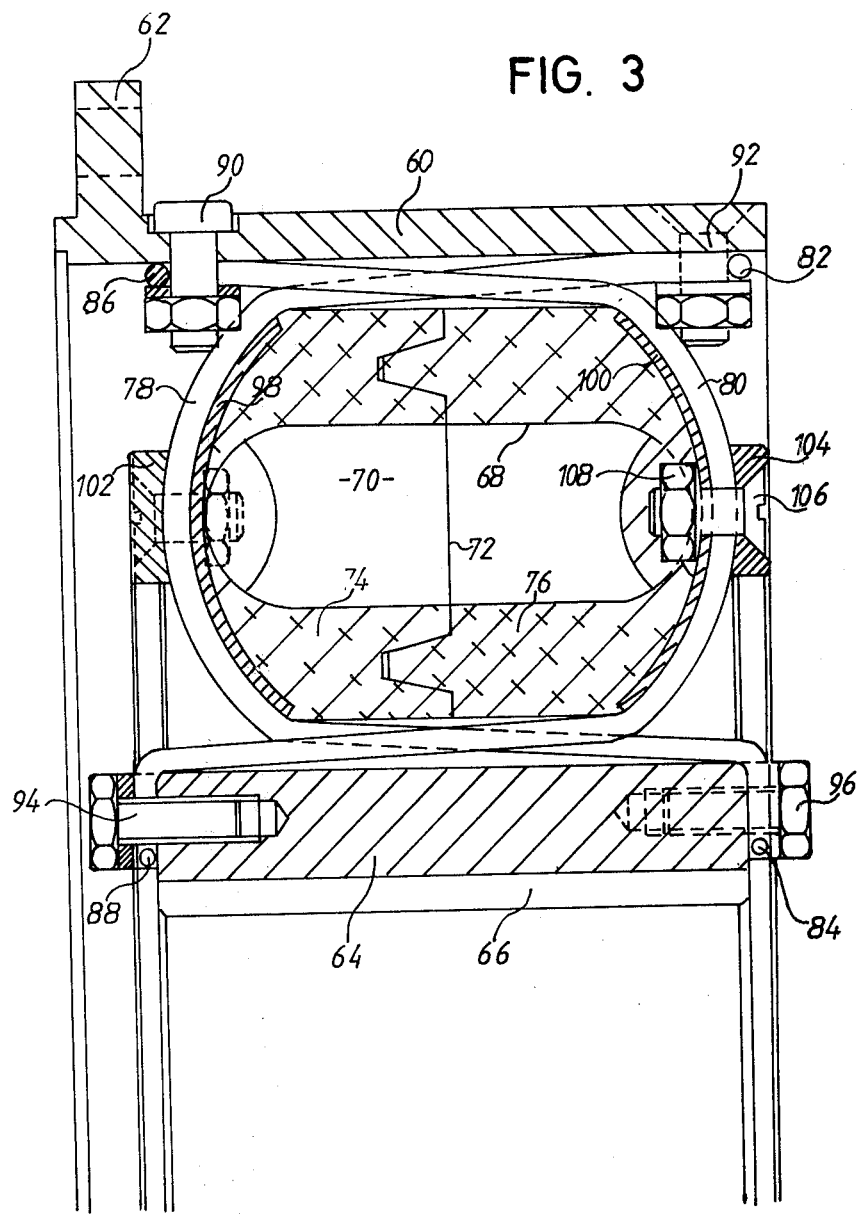
FIG. 3 is a longitudinal sectional view of another embodiment of a coupling in accordance with the invention.

In the embodiment of FIG. 3, the first coupling member 60 is a sleeve having a radial flange 62, by means of which the first coupling member may be attached to a flywheel. The second coupling member 64 is a hub coaxial with the sleeve 60 and adapted to be attached to a shaft by means of a keyway 66. The intermediate member 68 is an elastomeric or rubber body which defines a cavity 70 extending in peripheral direction, and which is divided substantially in a radial plane 72. The two parts 74 and 76 are connected to each other on their end faces, for example by cementing.

Similar to the embodiment of FIG. 1, the intermediate member 68 is a component separated from the coupling members and held between the coupling members 60 and 64 only by ropes 78 and 80, respectively, which are attached to the coupling members 60,64 and extend around the intermediate member 68 alternatingly on one side or on the other side thereof. Also with the embodiment of FIGS. 3 and 4 the ropes aattachment loop 82,84 and 86,88, respectively, being formed at each end thus provided. With these attachment loops the ropes are passed around radial bolts 90,92 of the first coupling member 60 and around axial bolts 94,96 on the end faces of the second coupling member 64. The attachment loops 82,84 of the rope 78 extending around the left side, as viewed in FIG. 3, of the intermediate member 68 are attached to the bolts 92 and 96 located on the right side in FIG. 3, while the attachment loops 86 and 88 of the rope extending around the right side, as viewed in FIG. 3, of the intermediate member 68 are attached to the bolts 90 and 94 on the left side in FIG. 3. In this way, similar to the embodiment of FIG. 1, the ropes are caused to loop around the intermediate member 68 as completely as possible and to ensure secure mounting thereof between the ropes. The intermediate member has elongated cross section, as can be seen from FIG. 3, i.e. it has cylindrical inner and outer surfaces and end faces, the cross section of which is circular. In this way, the space available between the first coupling member 60 and the second coupling member 64 is filled by the intermediate member 68 to an optimum extent.

Figure 4:
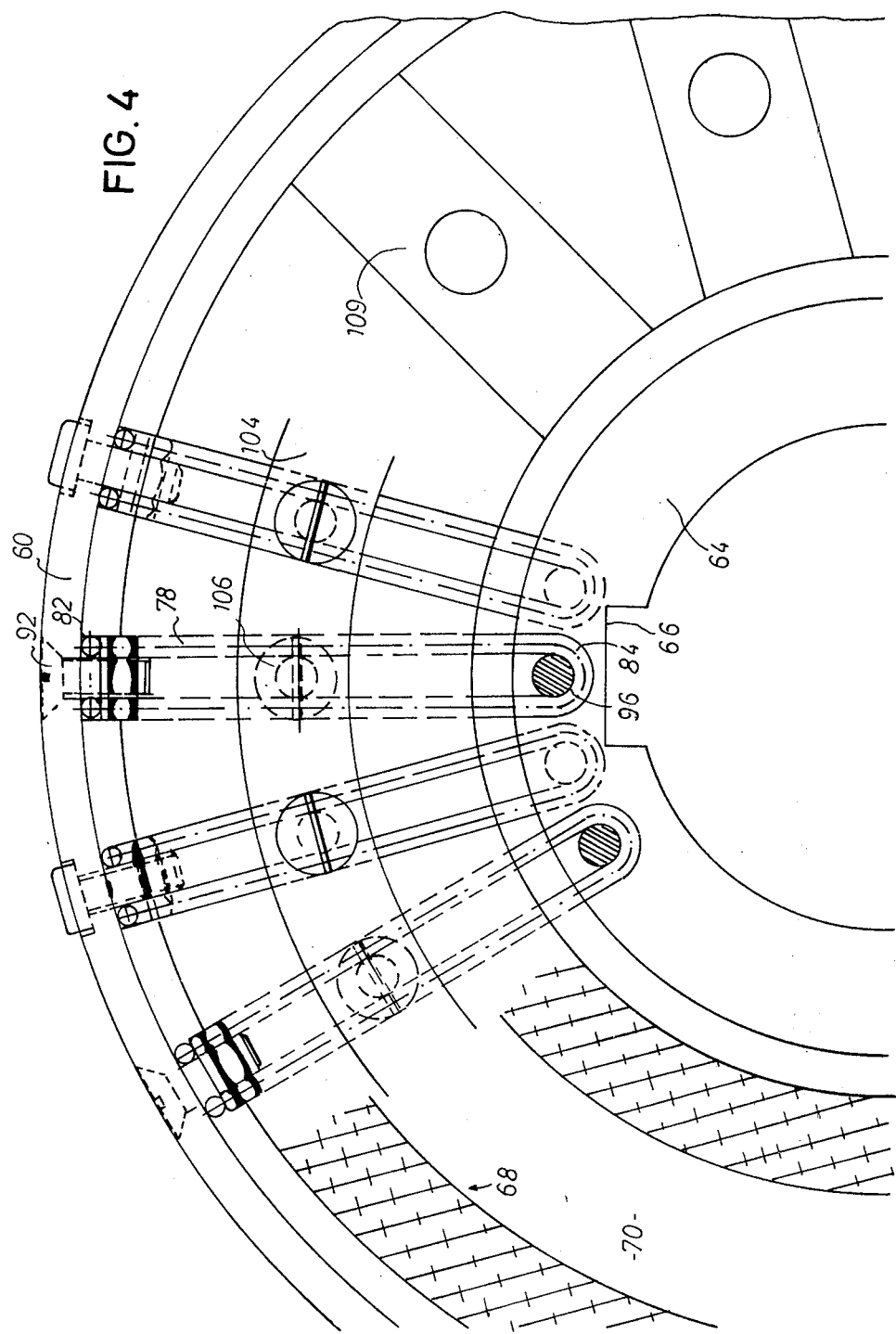
FIG. 4 is a view in the direction of the arrow A of FIG. 3.

Shell-shaped support bodies 98,100 are arranged on both sides of the intermediate member 68 on the end faces engaged by the ropes 78,80. Also here the support bodies 98 provided on one side are arranged in staggered relation to the support bodies 100 provided on the other side. The ropes 78 and 80 engage the outer surface of the support bodies. Contrary to the embodiment of FIG. 1, the ropes 78 and 80 in the embodiment of FIGS. 3 and 4 are clamped to the support bodies by means of releasable clamping devices. These clamping devices comprise rings 102,104, which are tightened against the support bodies 98,100 by means of bolts 106 and nuts 108 with the ropes 78 and 80 interposed.

Also with this embodiment the ropes may be embedded in strip-shaped rubber bodies 109, as shown in the right portion of FIG. 4.

Figure 5:
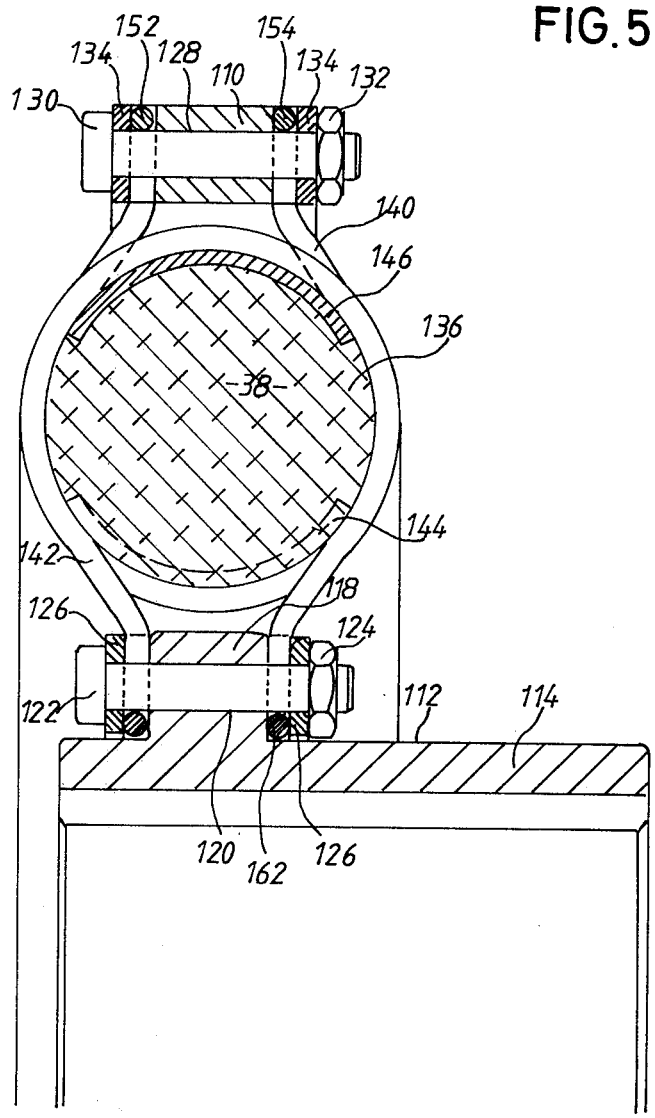
FIG. 5 is a longitudinal sectional view of a first embodiment of a coupling of the invention.

Referring now to FIG. 5, numeral 110 designates an annular, outer first coupling member and numeral 112 designates an inner, second coupling member. The inner coupling member comprises a hub 114 which can be mounted non-rotatably on a shaft by means of a keyway 116. The hub 114 has a radial flange 118. A circular array of axial bores 118 is provided in the radial flange 120, screw bolts 122 with nuts 124 and washers 126 being supported in said bores.

The outer, first coupling member 110 concentric thereto has also a circular array of axial bores 128, which contain screw bolts 130 with nuts 132 and washers 134. An intermediate member 136 comprises a rubber body 138 of generally toroidal shape, as can best be seen from FIG. 6. This rubber body is divided at least once in a longitudinal plane.

The intermediate member 136 with the rubber body 138 is held between the coupling members 110 and 112, by connection means, each of which comprises flexible but substantially not extensible elements in the form of rope loops 140 and 142 and shell-shaped support bodies 144 and 146, respectively. The shell-shaped support bodies are saddle-shaped, i.e. they are curved about the axis of rotation in the radial plane of FIG. 2 and about the center of the rubber body 138, which is circular in sectional view, if viewed in the longitudinal plane of FIG. 1. The support bodies connected to the first coupling member 110 by means of the flexible elements (rope loops 140) are shaped from each other and arranged on the inner side of the elastomeric or rubber body 138. The support bodies 146 connected to the coupling member 112 by means of the flexible elements (rope loops 142) are shaped from each other and are arranged on the outer side of the elastometric or rubber body in staggered relation to the support bodies, which are connected to the first coupling member. The elastomeric rubber body 138 is held freely between the coupling members 110 and 112 by the rope loops 140 and 142 through the support bodies 144 and 146. As can best be seen from FIG. 6, the rope loops are formed from a endless rope, thus from a rope the two ends of which are connected to each other. This endless rope is flatly folded together to form two parallel rope sections 148,150 (FIG. 6) and to form an attachment loop 152 and 154 at each of the two ends thus provided. The two parallel rope sections 148 and 150 form the rope loop 140 which passes around the support body 144. The screw bolt 130 extends through the two attachment loops 152 and 154, which are arranged on both sides of the coupling member 110 and which are clamped between this coupling member 110 and the washers 134 by tightening the nut 132. Correspondingly the rope loop 142 is also formed by an endless rope, which is flatly folded together to form two parallel rope sections 156 and 158 and to form an attachment loop 160 and 162 at each of the two ends thus provided. The two parallel rope sections 156 and 158 form the rope loop 142 and extend on the outside around the elastomeric or rubber body 138 and the support body 146. The screw bolt 122 extends through the two attachment loops 160 and 162, which are arranged on both sides of the radial flange 118 and are clamped between the radial flange 118 and the washers 126 by tightening the nut 124.

Figure 6:
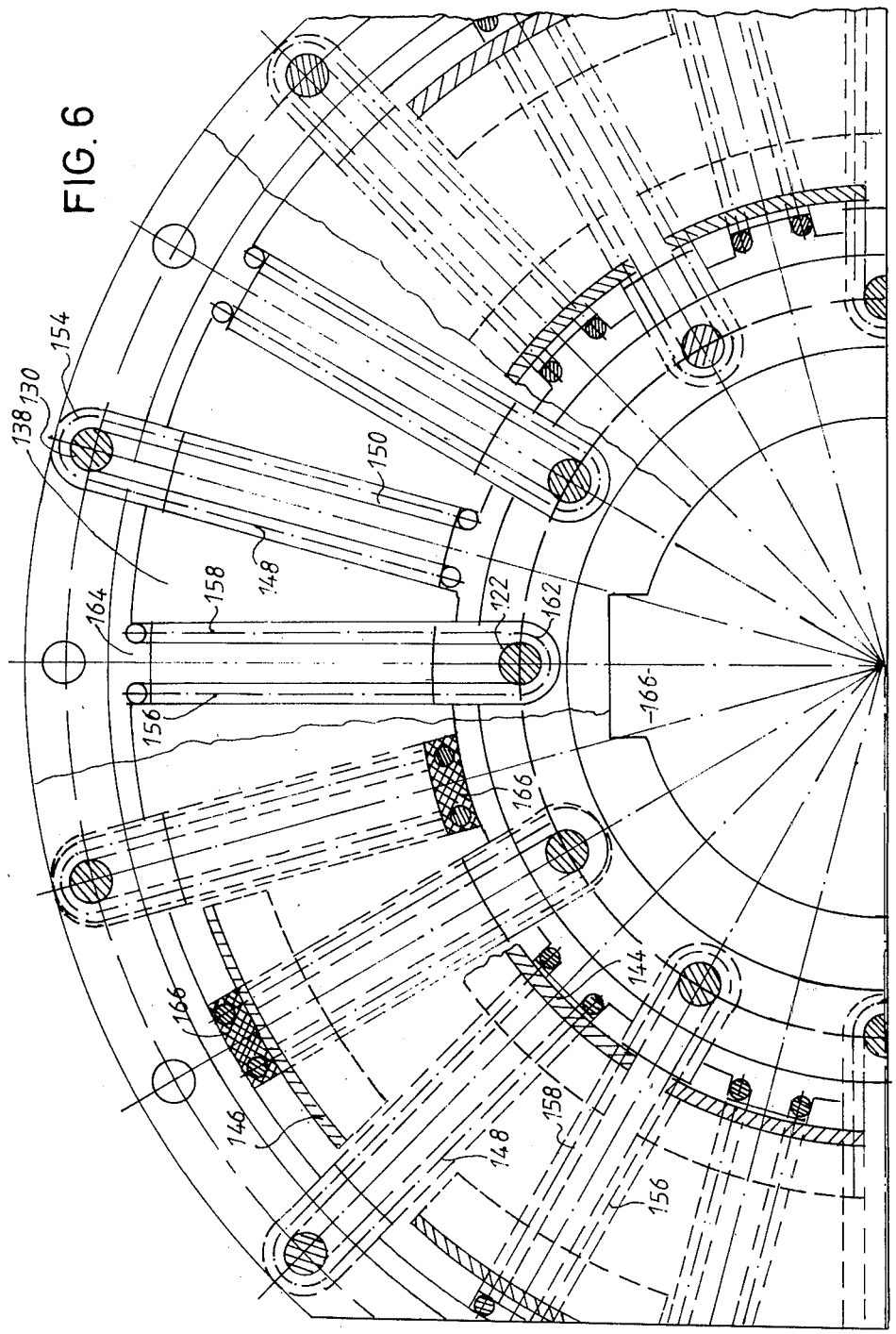
FIG. 6 shows the embodiment of FIG. 5 viewed in axial direction and partly in section.

As can be seen from FIG. 6, the support bodies 144 and 146 are vulcanized into the rubber body 138. The rubber body 138 has circumferential grooves 164 in longitudinal planes, in which grooves the rope loop 140 and 142 are guided. As can be seen from FIG. 6, each endless rope, in its folded-together state, may be held by threads, which are wound therearound and are vulcanized in this state into a rubber layer 166. Then the flexible elements are formed by a rubber strip, in which the endless rope is embedded in its folded-together form. In this way the ropes are more easily handled, and its contraction force is more uniformly transmitted to the elastomeric or rubber body 138.

With rotation of, for example, the first coupling member 110 relative to the second coupling member 112 held stationary, the rope loop 140 tends to pull the elastomeric or rubber body 138 substantially radially outwards, while the rope loop 142 tends to pull the elastomeric or rubber body 138 substantially radially inwards. Thus torque is transmitted through a resiliently deformable, elastomeric or rubber body, which, however, is exposed substantially only to compressive load by means of the ropes. There is no direct connection between the first coupling member 110 and the second coupling member 112. The intermediate member 138 also is not affixed directly to anyone of the coupling members 110,112. Therefore it is quite easy to exchange the intermediate member 136 with the rubber body 138, for example in order to change the stiffness of the coupling or to replace an intermediate member worn due to flexing work. To this end it is only necessary to unscrew the nuts 124 and 132. The rope loops 140 and 142 are folded back, and the intermediate member 136 can then be removed axially without dismantling the coupling members 110,112. Due to the fact that the intermediate member 136 is divided at least once in a longitudinal plane, the intermediate member may then be pulled laterally over the shaft without being impeded thereby.

Figure 7:
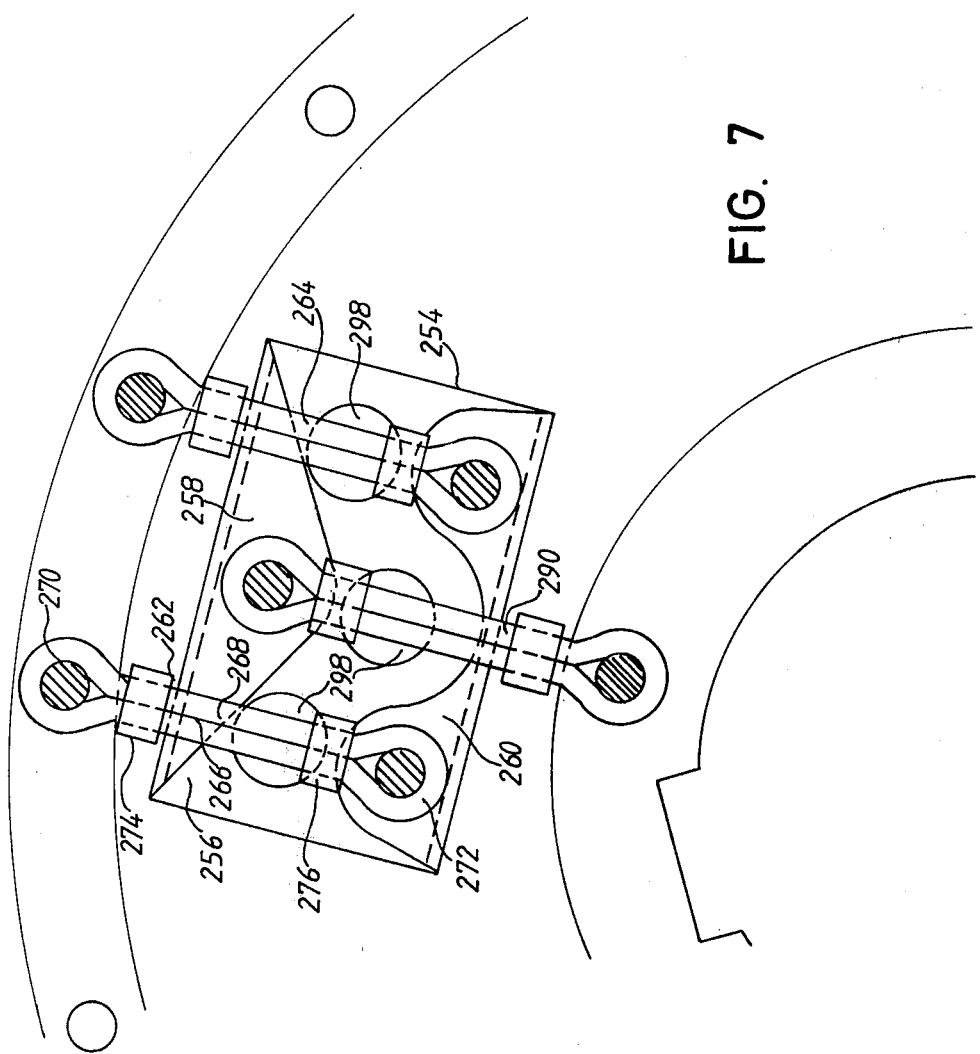
FIG. 7 is an axial view, partly in section, of another embodiment of the invention.
Figure 8:
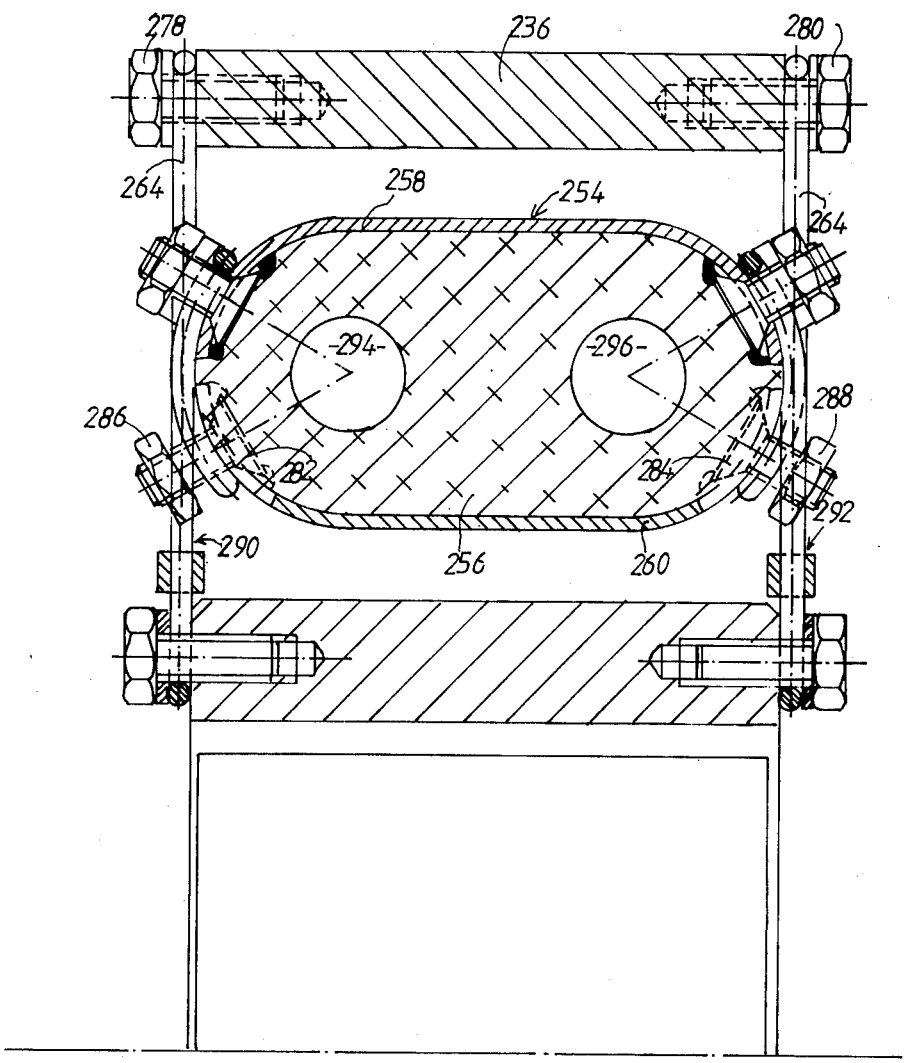
FIG. 8 is a sectional view along line C-D of FIG. 7.

In the embodiment of FIG. 7, which is illustrated in longitudinal sectional view in FIG. 8, a plurality of intermediate members 254 is provided in regular array between the two coupling members 236 and 238. Each of the intermediate members 254 consists of an elastomeric or rubber body 256 of oval cross section, a support body 258 on the outer side of the elastomeric or rubber body 256, and a support body 260 on the inner side of the elastomeric or rubber body 256. The support body 256 is connected to the first coupling member 236 by means of two pairs of flexible elements 262,264 arranged in the end regions. Each flexible element 262 or 264 consists of an endless rope, which has its median rope section 266,268 folded together and parallel and which forms an attachment loop 270 or 272, respectively, at each end provided thereby. Adjacent the attachment loops 270 and 272 the two rope sections 266 and 268 are held together by clamping devices 274,276.

Each of the flexible elements 262 is retained, on one hand, by bolts 278 and 280 in front of the end faces of the coupling member 236, and is affixed, on the other hand, to the support body 260 by means of bolts 282,284 and nuts 286,288. Thus the flexible elements 264 and the support body 260 form a loop which extends around the rubber body 256 on the inner side thereof.

Correspondingly the outer support body 258 is connected to the coupling member 238 by means of a pair of flexible elements 290,292.

The elastomeric or rubber body 256 defines circumferentially extending cavities 294,296 (FIG. 8) and/or transversely extending cavities 298.

Also here angular rotation of the coupling members 236 and 238 about the axis of rotation causes the rubber body 256 to be compressed, whereby torques are transmitted in vibration-damping manner by compressing a rubber body. In addition the use of a plurality of individual intermediate members in regular array permits angular offset of the shafts relative to each other, the intermediate members making a compensating movement.

Figure 9:
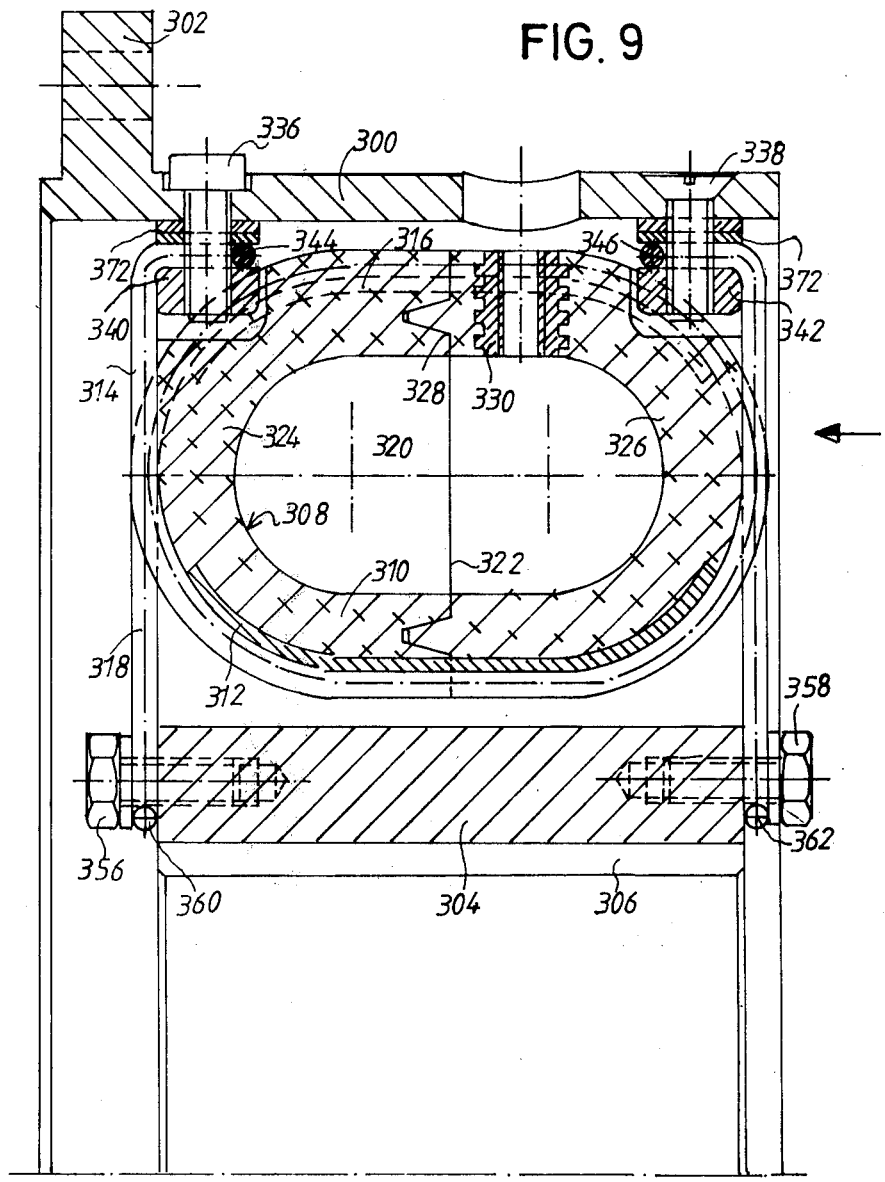
FIG. 9 is a longitudinal sectional view of a further embodiment of the invention.

In the embodiment illustrated in FIGS. 9 and 10, numeral 300 designates an outer, first coupling member, which is adapted to be bolted to, for example, a flywheel by means of a flange 302. Numeral 304 designates a hub-like, inner, second coupling member, which is adapted to be non-rotatably connected to a shaft by means of a keyway 306. An intermediate member 308 comprises a substantially toroidal elastomeric or rubber body 310, which is arranged between the annular or sleeve-shaped, outer, first coupling member 300 and the inner second coupling member 304. Spaced support bodies 312 are arranged on the inner side of the elastomeric or rubber body 312. These support bodies 312 are connected to the first coupling members 300 through flexible elements 314. Additional support bodies 316 are arranged, spaced from each other, on the outer side of the elastomeric or rubber body 310 and in staggered relation to the support bodies 312 connected to the first coupling member 300. These support bodies 316 are connected to the second coupling member 304 through flexible elements 318. The flexible elements 314 connected to the first coupling member 300 and the flexible elements 318 connected to the second coupling member 304 alternate in circumferential direction.

As can best be seen from FIG. 9, the toroidal elastomeric or rubber body 310 has a circumferentially extending cavity 320. The elastomeric or rubber body 310 is divided substantially in a radial plane 322, the two parts 324 and 326 being connected to each other by cementing or the like. The end faces 328 of the two parts 324 and 326 have complementary profiles. A threaded bushing 330 is vulcanized into the elastomeric or rubber body and is adapted to receive a valve screwed into it for generating an additional pressure within the cavity. A plurality of bushings may be provided distributed along the circumference, in order to vent the cavity and to dissipate heat.

As can be seen from FIG. 10, the generally toroidal elastomeric or rubber body 310 has wedge-shaped radial recesses 332 and 334 on its outer and inner sides, respectively.

The inner support bodies 312 are v-shaped in cross sectional view, i.e. as viewed in a cross section taken along a radial plane. Pairs of radial screw bolts 336,338 with nuts 340 and 342, respectively, are provided, axially spaced, in the annular first coupling member 300. A respective first flexible element 314 in the form of an endless rope is passed, at both ends, with attachment loops 344 and 346 around one of the screw bolts 336 and 338, respectively, and passes with its median rope sections 348,350 extending parallel to each other through the recess defined by the v-shaped cross section of the support body 312. The outer support bodies 316 are sheet metal parts of cylinder section shape which have u-shaped impressions 352,354 along their edges. Axial screw bolts 356,358 are provided on opposite sides on the inner coupling member 304. The second flexible element 318, also in the form of an endless rope, is passed on both sides with attachment loops 360 and 362 around axial screw bolts 356 and 358, respectively, diverges then v-shaped with the rope sections 364,366 adjacent each attachment loop 360 and 362, respectively, and is arranged with the spaced, parallel median rope sections 368,370 in the u-shaped impressions 352,354.

The attachment loops 344,346 of the first flexible elements are clamped between the nuts 340,342 and annular spacers 372, which are placed on the screw bolts 336 and 338.

As can be seen from FIG. 10, the toroidal, elastomeric or rubber body 310 is divided along the separation surface 374. Therefore it is possible, after unscrewing the nuts 342 and bolts 358, to fold the flexible elements 314 and 318 on the right side in FIG. 9 back and to pull the intermediate member 308 out to the right. As the intermediate member can then be taken apart along the separating surfaces 374, the intermediate member may, in this way, be removed and may be replaced by another one, without having to dismantle the remaining components of the coupling or the shaft.

The cavity 320 and the wedge-shaped recesses 332 and 334 permit resilient deformation of the elastomeric or rubber body 310, whereby torques may be transmitted yieldingly. In addition circulation of air through the cavity can be caused through the threaded bushings 330 to dissipate heat.

I claim:

1. A coupling for the vibration-damping transmission of torques, comprising:
    a first coupling member;
    a second coupling member substantially coaxial with said first coupling member;
    a resiliently deformable intermediate member arranged between said first and second coupling members;
    connection means for holding said intermediate member between said first and second coupling members, said connection means including a plurality of flexible elements, each of said flexible elements being attached to at least one of said first and second coupling members and each of said flexible elements engaging said intermediate member, said intermediate member being free from any structural connection to said coupling members other than said engagement with said flexible elements; and
    said first and second coupling members, said intermediate member, and said connection means being so constructed and arranged that said intermediate member is resiliently deformed by compressive loading from said flexible elements with relative angular movement of said first and second coupling members.

2. Apparatus of claim 1, wherein:
    said intermediate member is substantially toroidal;
    each of said flexible elements includes a first end attached to said first coupling member and a second end attached to said second coupling member; and
    a first portion of said plurality of flexible elements each include a loop extending around one side of said intermediate member, and a second portion of said plurality of flexible elements each include a loop extending around an opposite side of said intermediate member.

3. Apparatus of claim 1, wherein:
    said first coupling member includes a first annular element having first and second end faces on opposite sides thereof facing in axial direction;
    said second coupling member includes a second annular element having first and second end faces on opposite sides thereof facing in axial direction; and
    each of said flexible elements of said first portion of said plurality of flexible elements is further characterized as being attached to said first end faces of said first and second annular elements and said one side of said intermediate member is remote from said first end faces; and
    each of said flexible elements of said second portion of said plurality of flexible elements is further characterized as being attached to said second end faces of said first and second annular elements and said opposite side of said intermediate member is remote from said second end faces.

4. Apparatus of claim 3, further comprising:
    a plurality of shell-shaped first support bodies, spaced about said one side of said intermediate member;
    a plurality of shell-shaped second support bodies, spaced about said opposite side of said intermediate member, said second support bodies being staggered in relation to said first support bodies; and
    wherein said flexible elements are further characterized as engaging outer surfaces of said support bodies.

5. Apparatus of claim 2, further comprising a releasable clamping device clamping said flexible elements to said support bodies.

6. Apparatus of claims 1, 2, 3, 4 or 5, wherein said intermediate member includes a solid elastomeric body.

7. Apparatus of claims 1, 2, 3, 4 or 5, wherein said intermediate member includes an elastomeric body having a peripherally extending cavity disposed therein.

8. Apparatus of claim 7, wherein said elastomeric body is divided in a substantially radial plane into first and second parts, said first and second parts being connected at end faces thereof.

9. Apparatus of claims 1, 2, 3, 4 or 5, wherein said intermediate member is divided at least once along a longitudinal plane of said coupling.

10. Apparatus of claims 1, 2, 3, 4 or 5, wherein each of said flexible elements is further characterized as being endless and being folded together to form two parallel sections thereof, each of said sections engaging said intermediate member, said sections being joined together at their ends by attachment loop portions extending around bolt means connected to at least one of said first and second coupling members.

11. Apparatus of claim 1, wherein:
    a first portion of said plurality of flexible elements each are attached only to the first of said first and second coupling members; and a second portion of said plurality of flexible elements each are attached only to the second of said first and second coupling members.

12. Apparatus of claim 11, wherein:
said connection means further includes a first support body means engaging said intermediate member on a first side of said intermediate member remote from said first coupling member, and a second support body means engaging said intermediate member on a second side of said intermediate member remote from said second coupling member;
said first support body means is connected to said first coupling member by said first portion of said pluraltiy of flexible elements, said first support body means and said first portion of said plurality of flexible elements comprising loops extending around said intermediate member; and
said second support body means is connected to said second coupling member by said second portion of said plurality of flexible elements, said second support body means and said second portion of said plurality of flexible elements comprising loops extending around said intermediate member.

13. Apparatus of claim 12, wherein:
said first portion of said plurality of flexible elements each include a loop extending around an outer surface of said first support body means; and
said second portion of said plurality of flexible elements each include a loop extending around an outer surface of said second support body means.

14. Apparatus of claim 12, wherein:
said first portion of said plurality of flexible elements each include a first end attached to said first coupling member and a second end attached said first support body means; and
said second portion of said plurality of flexible elements each include a first end attached to said second coupling member and a second end attached to said second support body means.

15. Apparatus of claim 12, 13 or 14, wherein each of said flexible elements is further characterized as being endless and being folded together to form two parallel sections, said sections being joined by attachment loops at each end of said sections.

16. Apparatus of claim 12, wherein:
said first coupling member is further characterized as being an annular radially outer coupling member;
said second coupling member is further characterized as being an annular radially inner coupling member;
said intermediate member is further characterized as being a substantially toroidal elastomeric body arranged between said first and second coupling members, said first and second sides of said intermediate member being further characterized as radially inner and outer sides, respectively;
said first support body means includes a plurality of first support bodies peripherally spaced about said radially inner side of said intermediate member;
said second support body means includes a plurality of second support bodies peripherally spaced about said radially outer side of said intermediate member, said second support bodies being peripherally staggered in relation to said first support bodies; and
said flexible elements of first portion and said second portion of said plurality of flexible elements are peripherally alternated.

17. Apparatus of claim 16, wherein said toroidal elastomeric body is divided at at least one location along its periphery.

18. Apparatus of claim 16, wherein said toroidal elastomeric body is further characterized as having a peripherally extending cavity disposed therein.

19. Apparatus of claim 18, wherein said toroidal elastomeric body includes a threaded bushing vulcanized into said elastomeric body, said bushing being adapted to receive a threaded valve means for generating an additional pressure within said cavity.

20. Apparatus of claim 18 or 19, wherein said toroidal elastomeric body is further characterized as being divided along a substantially radial plane into first and second parts, said first and second parts being connected together.

21. Apparatus of claim 20, wherein said first and second parts of said toroidal elastomeric body are each further characterized as having an end face, said end face of said first part having a profile complementary to a profile of said end face of said second part.

22. Apparatus of claim 16, wherein said substantially toroidal elastomeric body is further characterized as having inner wedge-shaped radial recesses disposed on its radially inner side between said first support bodies, and as having outer wedge-shaped radial recesses disposed on its radially outer side between said second support bodies.

23. Apparatus of claim 16, wherein:
each of said first support bodies is further characterized as being v-shaped in a cross sectional view taken along a plane normal to a longitudinal axis of said coupling;
said first coupling member includes pairs of first and second axially spaced radial screw bolt means;
each of said flexible elements of said first portion of said plurality of flexible elements includes an endless rope having first and second attachment loops extending around said first and second screw bolt means, respectively, of one of said pairs of first and second axially spaced radial screw bolt means, said endless rope further including first and second rope sections extending through a recess formed by said v-shaped cross section of one of said first support bodies;
each of said second support bodies is further characterized as being an arcuate support body having first and second peripherally spaced u-shaped axially extending impressions disposed in its outer surface;
said second coupling member includes pairs of first and second axially spaced axial screw bolt means on axially opposite sides of said second coupling member; and
each of said flexible elements of said second portion of said plurality of flexible elements includes an endless rope having first and second attachment loops extending around said first and second axial screw bolt means of one of said pairs of axially spaced axial screw bolt means, said endless rope further including first and second median rope sections engaging said first and second u-shaped impressions of one of said second support bodies.

24. Apparatus of claim 23, wherein said first and second attachment loops of said endless rope of each of said flexible elements of said first portion of said plurality of flexible elements are further characterized as being clamped between nut means and annular spacer means placed on each of said first and second radial screw bolt means, respectively.

25. Apparatus of claim 11, wherein:
said first coupling member is further characterized as being an annular radially outer coupling member;
said second coupling member is further characterized as being an annular radially inner coupling member;
said intermediate member comprises a plurality of elastomeric bodies, each of said elastomeric bodies being connected to said first outer coupling member by peripherally spaced flexible elements of said first portion of said plurality of flexible elements, and each of said elastomeric bodies being connected to said second inner coupling member by at least one of said flexible elements of said second portion of said plurality of flexible elements, said one flexible element of said second portion being arranged between said peripherally spaced flexible elements of said first portion.

26. Apparatus of claim 25, wherein:
said connection means further includes a first support body engaging a radially inner side of one of said elastomeric bodies, and includes a second support body engaging a radially outer side of said one of said elastomeric bodies;
each of said peripherally spaced flexible elements of said first portion of said plurality of flexible elements includes a pair of axially spaced flexible element components attached to axially opposite sides of said first support body; and
said one flexible element of said second portion of said plurality of flexible elements includes a pair of axially spaced flexible element components attached to axially opposite sides of said second support body.

27. Apparatus of claim 26, wherein each of said elastomeric bodies is further characterized as having a cavity disposed therein.

* * * * *

UNITED STATES PATENT AND TRADEMARK OFFICE
CERTIFICATE OF CORRECTION

PATENT NO. : 4,246,767

DATED : January 27, 1981

INVENTOR(S) : Ilie Chivari

It is certified that error appears in the above-identified patent and that said Letters Patent are hereby corrected as shown below:

Page 1, under section entitled Foreign Application Priority Data, insert --

Feb. 15, 1978 [DE] Fed. Rep. of Germany ..... 2,806,349

Signed and Sealed this

Twenty-third Day of February 1982

[SEAL]

Attest:

Attesting Officer

GERALD J. MOSSINGHOFF

Commissioner of Patents and Trademarks